United States Patent [19]

Ohtsuka

[11] Patent Number: 5,060,103

[45] Date of Patent: Oct. 22, 1991

[54] MAGNETIC DISC APPARATUS HAVING PROTECTIVE SHIELD FOR ELIMINATING SPURIOUS MAGNETISM AT A MAGNETIC HEAD

[75] Inventor: Kyoichi Ohtsuka, Amagasaki, Japan

[73] Assignee: Mitsubishi Denki Kabushiki Kaisha, Tokyo, Japan

[21] Appl. No.: 469,062

[22] Filed: Jan. 19, 1990

[30] Foreign Application Priority Data

Jan. 21, 1989 [JP] Japan .................. 1-5957[U]

[51] Int. Cl.⁵ .............................................. G11B 5/11
[52] U.S. Cl. .................................. 360/128; 360/97.03
[58] Field of Search ................... 360/128, 97.02, 97.03

[56] References Cited

U.S. PATENT DOCUMENTS

| 4,924,337 | 5/1990 | Repphun | 360/128 |
| 4,935,830 | 6/1990 | Hiraoka | 360/128 |

FOREIGN PATENT DOCUMENTS

60-173118 11/1985 Japan .
61-280402 11/1986 Japan .
62-171087 10/1987 Japan .

*Primary Examiner*—A. J. Heinz
*Attorney, Agent, or Firm*—Wolf, Greenfield & Sacks

[57] ABSTRACT

A magnetic disc apparatus reads and writes information on a magnetic disc. The apparatus is provided with a magnetic head positioned so that a reading portion of the head faces the magnetic surface of the disc. The apparatus further includes the shield member having a first side facing the peripheral edge of the disc to isolate the magnetic head from spurious magnetism. The shield is held in a supporting body member in slidable fashion so that shield member may be slid along the line orthogonal to the plane of the disc. The distance across the shield member from the first side to the second side varies along a line orthogonal to the plane of the disc. This thickness determines the clearance distance between the shield member and the peripheral edge of the disc. As such this distance is freely adjustable by sliding the shield member within the supporting member.

13 Claims, 7 Drawing Sheets

MAGNETIC DISC APPARATUS HAVING PROTECTIVE SHIELD FOR ELIMINATING SPURIOUS MAGNETISM AT A MAGNETIC HEAD

BACKGROUND OF THE INVENTION

1. Field of the Invention

This invention relates to a magnetic disc apparatus provided with a shield member for reducing noise coupling to a magnetic head.

2. Description of Related Art

Figure 1:
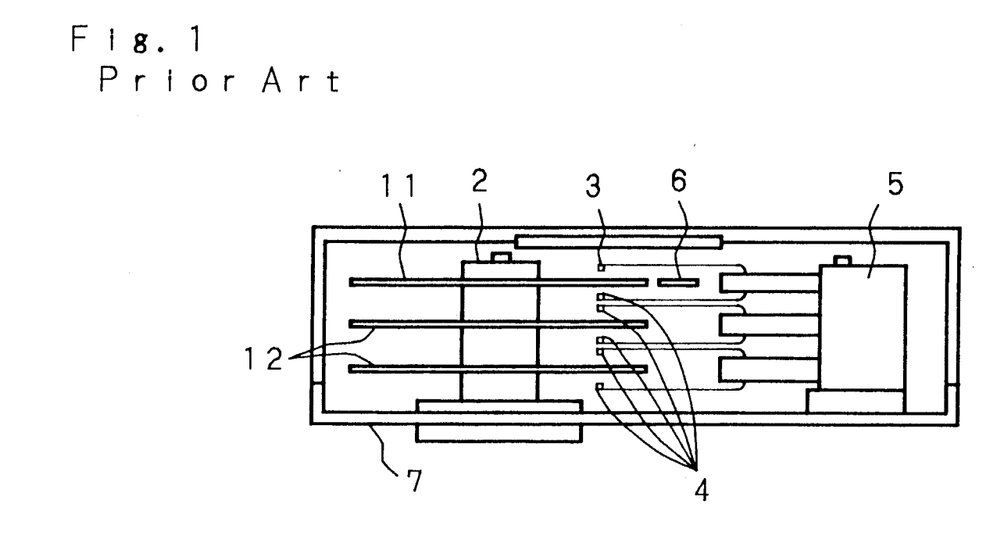
FIG. 1 is a side sectional view showing the configuration of a conventional magnetic disc apparatus.

FIG. 1 is a sectional view showing a configuration of a conventional magnetic disc apparatus shown in, for example, Japanese Utility Model Application Laid-Open No. 60-173118 (1985). In FIG. 1 spindle motor 2 and an actuator 5 are fixed on a base 7 thereof. The spindle motor 2 drives to rotate recording/reproducing discs 12 wherein information is magnetic-recorded and a servo disc 11 having a servo surface wherein servo information, for positioning a recording/ reproducing head 4 which is described later, is magnetic-recorded. The actuator 5 drives a servo head 3 which reads the servo information from the servo disc 11 interlockingly with the recording/reproducing head 4 which reads information from the recording/reproducing disc 12.

At the position facing the periphery of the servo head 3, a shield plate 6 made of ferrite, permalloy or the like is provided, thereby preventing magnetism from entering the servo head 3 except for the servo information to be read.

In this conventional magnetic disc apparatus, the servo head 3 reads the positional information thereof by an electro-magnetic converting operation from the servo surface of the facing servo disc 11, thereby positioning the servo head 3 and the recording/reproducing head 4 interlocking with the servo head 3. But as noises such as electromagnetic wave and the like produced by the recording/reproducing head 4, except for the signals read from the servo surface of the servo disc 11, enters the servo head 3, this result in bad accuracy in positioning the servo head 3 and the recording/reproducing head 4. Therefore the noises coming to the servo head 3 are reduced by the shield plate 6 provided along the periphery of the servo disc 11, thereby improving the accuracy of positioning of the servo head 3 and the recording/reproducing head 4. The conventional shield plate 6 provided along the periphery of the servo disc 11 must approach to the periphery of the servo disc 11 as close as possible in order to reduce noises coming to the servo head 3. Moreover, it is necessary to provid the shield plate 6 and the servo disc 11 so as not to contact each other.

In the conventional magnetic disc apparatus, when the shield plate 6 faces the servo disc 11, usually a clearance gage is used or something like that to adjust the clearance, but there is a problem that working efficiency in installing the shield plate 6 is bad as the clearance between the servo disc 11 and the shield plate 6 is minute.

SUMMARY OF THE INVENTION

The present invention has been devised to solve the problem above mentioned.

The primary object of the present invention is to provide a magnetic disc apparatus which is capable of carrying out the positioning of the shield member easily and accurately to improve working efficiency in installing the shield member, by making the shield member, which is to be installed with minute clearance being provided between the periphery of the magnetic disc and the shield member itself, movable in the vertical direction against the surface of the magnetic disc.

The above and further objects and features of the invention will more fully be apparent from the following detailed description with accompanying drawings.

BRIEF DESCRIPTION OF THE DRAWINGS

FIG. 4(*a*) is a schematic side sectional view depicting a first embodiment, a shield member in a first position.

FIG. 4(*b*) is a schematic side sectional view depicting the first embodiment of a shield member in a second position.

FIG. 5(*a*) is a schematic side sectional view of a second embodiment of a shield member in a first position.

FIG. 5(*b*) is a schematic side sectional view depicting the second embodiment of a shield member in a second position.

DESCRIPTION OF THE PREFERRED EMBODIMENTS

Figure 2:
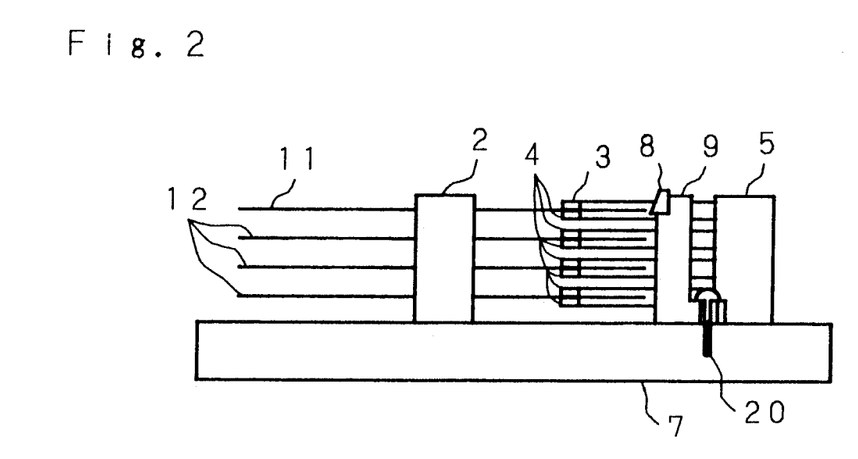
FIG. 2 is a side sectional view of a magnetic disc apparatus of the invention.
Figure 3:
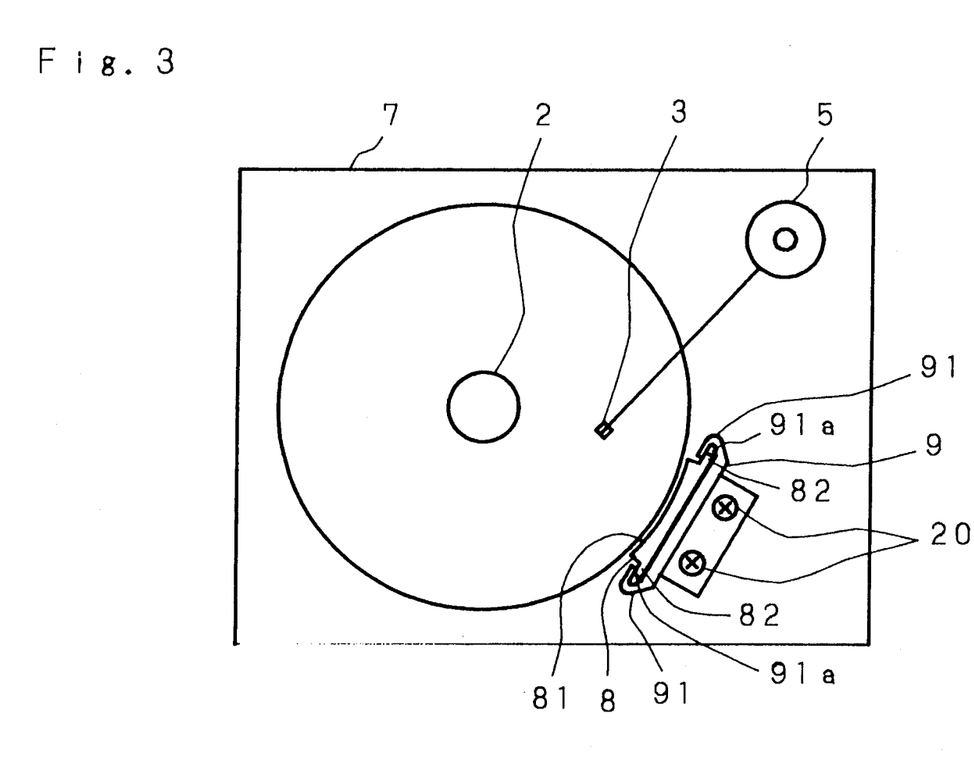
FIG. 3 is a plan sectional view of the apparatus of FIG. 2.

In the following, explanation will be given on one embodiment of the invention referring to the drawings. FIG. 2 is an elevation view of the magnetic disc apparatus of the invention. FIG. 3 is a plan view thereof.

On the middle portion of the base 7, a spindle motor 2 is set up. The spindle motor 2 drives to rotate the recording/reproducing discs 12 wherein information is magnetic-recorded and the servo disc 11 having a servo surface on which the servo information for positioning the recording/reproducing head 4, to be describe later, is magnetic-recorded.

On the base 7, appropriately separated from the peripheral edges of the servo disc 11 and the recording/reproducing disc 12, an actuator 5 is set up. The actuator 5 drives the servo head 3 which reads the servo information from the servo disc 11 interlockingly with the recording/reproducing head 4 which reads the information from the recording/reproducing disc 12 in the parallel direction to the disc surfaces of the servo disc 11 and the recording/reproducing disc 12.

On the base 7, in the vicinity of the peripheral edges of the servo disc 11 and the recording/reproducing disc 12, an L-shaped mounting stand 9 is set up. The foot of the mounting stand 9 has an elliptical unloaded hole, being fixed on the base 7 by a screw 20 which is passed through the unloaded hole, and is adjustable of the fixed position thereof within the extent of the unloaded hole. On both sides of the upper end of the column of the mounting stand 9, a U-shaped grip portion 91 (FIG. 3) made of elastic material in a plan view is provided extending the length required for vertical motion of the shield member 8. Grooves 91*a* of the grip portion 91 make the shield member 8 slidable, and on the other hand, fix the shield member 8 by its elasticity.

The plate-formed shield member 8 made of ferrite, permalloy or the like, is in the form of a trapezoid in the elevation view, that is, the thickness thereof gradually increases downward. In the plan view of FIG. 3, the side which is to be fixed to the mounting stand 9 makes a straight line, and the side which is to be provided to face the servo disc 11 has a curve going along with the periphery of the servo disc 11 corresponding to the moving range of the servo head 3, and the surface of the side to be provided to face the servo disc 11 is a cylindrical surface 81. The cylindrical surface 81 inclines at a predetermined angle facing the servo surface of the servo disc 11 when the shield member 8 is installed at the mounting stand 9, thereby preventing the magnetism, except the servo information to be read, from entering the servo head 3. On both sides of the cylindrical surface 81, gripped portions 82 are provided which are formed thinner than other part so that they can be inserted into the grooves 91a of the grip portion 91.

Figure 4A:
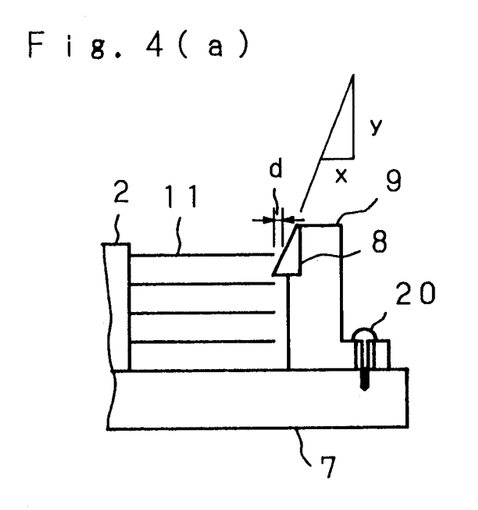
Figure 4B:
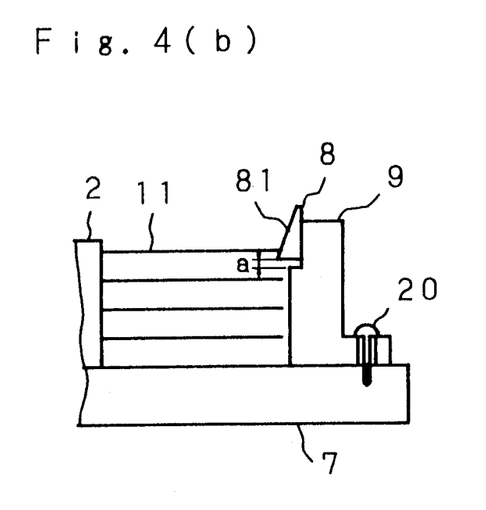

Next, explanation will be given on a working procedure in installing the shield member 8. FIG. 4 is a schematic elevation view of the magnetic disc apparatus explaining the principle of positioning the shield member 8. As shown in FIG. 4(a), assume that the inclination of the cylindrical surface 81 of the shield member 8 is y/x, and the required space between the servo disc 11 and the shield member 8 is d. As shown in FIG. 4(b), the gripped portions 82 are inserted into the grooves 91a with the shield member 8 being raised by the clearance of a=d·y/x upward in the mounting stand 9, then the mounting stand 9 is moved until the cylindrical surface 81 of the shield member 8 touches the peripheral edge of the servo disc 11. At the position the cylindrical surface 81 touches the peripheral edge, the mounting stand 9 is fixed to the base 7 by tightening of the screw 20.

After that, when the shield member 8 is moved until the clearance a is 0, the clearance between the shield member 8 and the servo disc 11 becomes d. In this case, when the inclination y/x of the cylindrical surface 81 of the shield member 8 is large, the clearance a is large in comparison with the minute clearance d, thereby the clearance between the shield member 8 and the servo disc 11 can be adjusted by closer pitch.

Figure 5A:
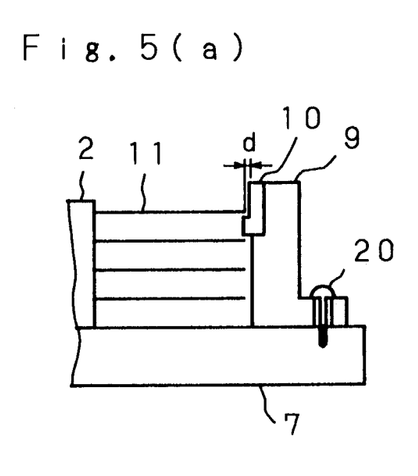
Figure 5B:
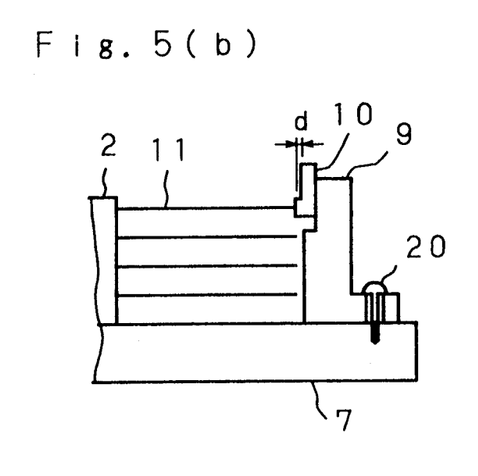

In addition, in this embodiment, the surface of the shield member 8 facing the servo disc 11 is leaning against the servo surface, but the invention is not limited to this. As shown in FIG. 5, it is also preferable that the lower part of a shield member 10 is projecting by the clearance d between the shield member 10 and the servo disc 11, and as shown in FIG. 5(b), the shield member 10 is raised so that the lower part thereof touches the periphery of the servo disc 11. At the position where the lower part touches the periphery, the mounting stand 9 is fixed to the base 7 by tightening by the screw 20, thereafter, as shown in FIG. 5(a), the shield member 10 is lowered and fixed to make the clearance between the upper part thereof and the servo disc 11 be d.

Figure 7:
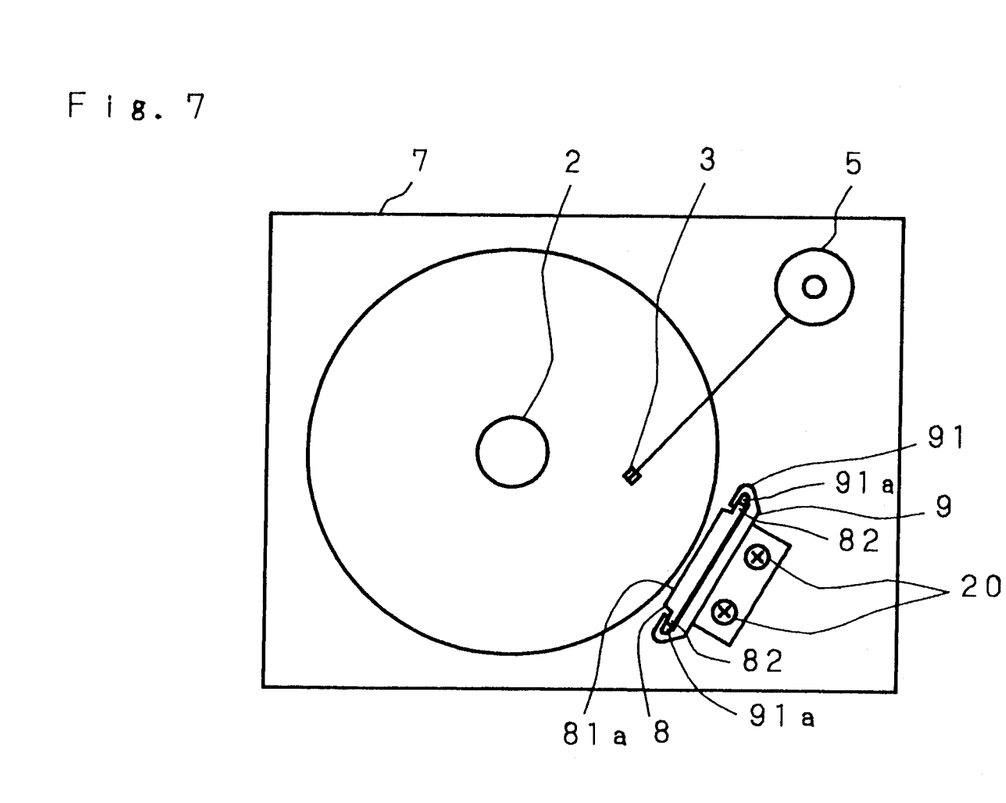

Still more, in this embodiment, the surfaces of the shield members 8 and 10 facing the periphery of the servo disc 11 are cylindrical surfaces, but a conical surface, an arbitrary curved surface, or a plane surface 81a as shown in FIG. 7 will do.

Figure 6:
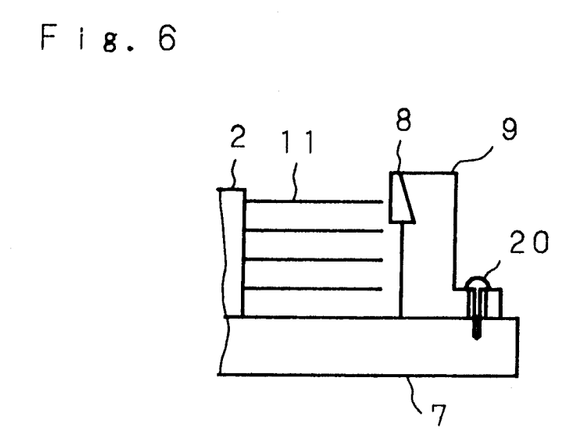
FIG. 6 and FIG. 7 are side sectional and plan views schematically showing a configuration of other embodiments of a magnetic disc apparatus of the invention.

Furthermore, in this embodiment, the surface facing the periphery of the servo disc 11 is made to be inclined, however, as shown in FIG. 6, it is also preferable that the surface of the mounting stand 9 at the side of supporting the shield member 8 and the surface of the shield member 8 at the side of being installed on the mounting stand 9 are made to be inclined and the surface of the shield member 8 facing the servo disc 11 is perpendicular to the servo surface. After the shield member 8 is raised upward to touch the periphery of the servo disc 11, then lowered, the clearance d can be obtained in the same principle as in the aforesaid embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A magnetic disc apparatus comprising:
a magnetic disc positioned on a rotatable spindle and having a face on which magnetically encoded information is stored;
a driving means for rotating the spindle on which the magnetic disc rests to drive the disc;
a magnetic head positioned so that a reading portion of the magnetic head faces the face of said magnetic disc on which magnetically encoded information is stored, said magnetic head reading information from said magnetic disc;
a shield member having a first side facing the peripheral edge of said magnetic disc to isolate the magnetic head from sources of magnetism other than magnetism of information magnetically encoded on said face of said disc and a second support side wherein distance across said shield member from the first side to the second side varies along a line orthogonal to the plane of the disc to provide a clearance distance between said shield member and the peripheral edge of the disc; and
a supporting body member including means for slidably supporting said shield member at its support side, said means for slidably supporting said shield member facilitating sliding of the shield member along the line orthogonal to the plane of the disc, whereby the clearance distance between said shield member and the peripheral edge of said magnetic disc is changeable due to the sliding of said shield member along said line orthogonal to the plane of the disc.

2. A magnetic disc apparatus as set forth in claim 1, wherein the first side of said shield member facing the peripheral edge of said magnetic disc inclines at a predetermined angle to the face said magnetic disc.

3. A magnetic disc apparatus as set forth in claim 1, wherein the first side of said shield member facing the peripheral edge of said magnetic disc is perpendicular to the surface of said magnetic disc, while a side of said supporting body supporting said shield member and the second support side of said shield member incline at a predetermined angle relative to the face of said magnetic disc.

4. A magnetic disc apparatus as set forth in claim 1, wherein an upper or a lower part of the first side of said shield member facing the peripheral edge of said magnetic disc projects outward along the plane of the magnetic disc.

5. A magnetic disc apparatus as set forth in claim 1, wherein the first side of said shield member facing the peripheral edge of said magnetic disc is a curved surface.

6. A magnetic disc apparatus as set forth in claim 1, wherein the second support side of said shield member facing the peripheral edge of said magnetic disc is a planar surface.

7. In a magnetic disc apparatus having a magnetic disc and a magnetic head with a reading section facing a surface of said magnetic disc on which information is magnetically encoded, a shield member having a first side facing a peripheral edge of said magnetic disc and a second support side wherein distance across said shield member from the first side to the second side varies along a line orthogonal to the plane of the disc to provide a clearance distance between said shield and the peripheral edge of the disc, for preventing magnetism from coupling to said magnetic head, except magnetism of magnetically encoded information to be read by said magnetic head, and means for supporting said shield member at a position facing the peripheral edge of said magnetic disc, said means for supporting including means for enabling sliding of said shield member in a direction substantially orthogonal to the surface of said magnetic disc so as to select a desired gap between the shield member and the peripheral edge of said magnetic disc wherein said gap is dictated by the distance across the shield from said first side to said second support side for a portion of the disc that is aligned with a plane of the magnetic disc.

8. In a magnetic disc apparatus as set forth in claim 7 wherein said means for enabling sliding permits the shield member to move between a position in which the first side of the shield member facing the peripheral edge of said magnetic disc contacts the magnetic disc to a permanent position wherein the second support side of the shield member facing the peripheral edge of said magnetic disc is accurately spaced from the magnetic disc.

9. In a magnetic disc apparatus as set forth in claim 7 wherein the first side of said shield member facing the peripheral edge of the magnetic disc is inclined at a predetermined angle to the face of said magnetic disc.

10. In a magnetic disc apparatus as set forth in claim 7 wherein the first side of said shield member facing the peripheral edge of said magnetic disc is perpendicular to the face of said magnetic disc, while a side of said means for supporting said shield member and the second support side of said shield member facing said means for supporting incline at a predetermined angle to the face of said magnetic disc.

11. In a magnetic disc apparatus as set forth in claim 7 wherein a portion of the first side of said shield member facing the peripheral edge of said magnetic disc projects from a remainder of the shield member.

12. In a magnetic disc apparatus as set forth in claim 7 wherein the first side of said shield member facing the peripheral edge of said magnetic disc is disposed in a curved surface.

13. In a magnetic disc apparatus as set forth in claim 7 wherein the first side of said shield member facing the peripheral edge of said magnetic disc extends in a planar manner.

* * * * *